United States Patent [19]

Tanaka

[11] Patent Number: 5,434,486
[45] Date of Patent: Jul. 18, 1995

[54] SYNCHRONOUS OPERATION SYSTEM
[75] Inventor: Yoshikazu Tanaka, Kawasaki, Japan
[73] Assignee: Fuji Electric Co., Ltd., Kawasaki, Japan
[21] Appl. No.: 86,709
[22] Filed: Jul. 7, 1993
[51] Int. Cl.$^6$ ............................................. H02P 7/68
[52] U.S. Cl. ...................................... 318/69; 318/77; 318/85
[58] Field of Search ................. 318/44, 625, 52, 53, 318/59, 66, 68, 69, 77, 78, 85, 6, 7, 49, 568.11; 242/186, 191; 72/9, 17; 307/43, 46, 44; 364/431.05, 565

[56] References Cited

U.S. PATENT DOCUMENTS

| 4,016,735 | 4/1977 | Peterson | 72/9 |
| 4,448,368 | 5/1984 | Shalko | 318/6 |
| 4,728,806 | 3/1988 | Baker et al. | 307/43 |
| 5,222,022 | 6/1993 | Adams et al. | 364/431.07 |
| 5,252,900 | 10/1993 | Uehara et al. | 318/573 |

Primary Examiner—John W. Cabeca
Attorney, Agent, or Firm—Kanesaka & Takeuchi

[57] ABSTRACT

In a synchronous operation system, rotating positions of two rotating elements MSP and SSP driven by induction motors $IM_1$ and $IM_2$ are maintained in a predetermined positional relation, what is called, a synchronous control by a position adjuster 7. A gain compensating circuit 10 for adjusting an output of the position adjuster 7 by using a detected speed of one rotation element SSP as a parameter is provided, and the gain compensating circuit 10 adjusts the output of the position adjuster 7. Thus, a slippage of the induction motor is compensated in a speed region where the position variation of the two rotating elements becomes excessively large, or in a high speed region (constant output region) exceeding a basic rotation speed in case the synchronous control is carried out by using an induction motor and an invertor for controlling a primary frequency of the induction motor.

6 Claims, 4 Drawing Sheets

SYNCHRONOUS OPERATION SYSTEM

BACKGROUND OF THE INVENTION AND RELATED ART STATEMENT

The invention relates to a synchronous operation system for retaining rotating positions of two rotating elements driven by respective induction motors in a predetermined positioning relation making use of a position adjuster, that is, for performing a synchronous control.

In machine tools and the like, rotating positions of two rotating elements may be held in a predetermined positioning relation, so called, a synchronous control may be carried out.

FIG. 3 shows an example of the system, wherein synchronous controls of a spindle on a master side and a spindle on a slave side, as the rotating elements, are carried out by using induction motors and inverters for performing a primary frequency control of the induction motor.

In the same drawing, a synchronous speed command value is applied to an inverters 2 on the master side as a speed command value and to an inverters 3 on the slave side as a speed standard value through a soft start-stop circuit 1 for performing smooth acceleration and deceleration at the time of starting or stopping the system. Induction motors $IM_1$ and $IM_2$ are controlled by the speed command value and the speed standard value, whereby a spindle MSP on the master side and a spindle SSP on the slave side are driven. Also, the position detections of the respective spindles MSP and SSP are carried out by a position detector $PE_1$ on the master side and a position detector $PE_2$ on the slave side, which are formed of pulse encoders and provided at respective shafts. Output signals of the master side position detector $PE_1$ and the slave side position detector $PE_2$ are respectively applied to a master side speed detecting circuit 4 and a slave side speed detecting circuit 5, and the output of the master side speed detecting circuit 4 is applied, as a speed setting value and the output of the slave side speed detecting circuit 5 is applied, as a speed detecting value, to a speed adjusting circuit 6 for calculating the speed variations of the respective spindles MSP and SSP.

The speed standard value of the slave side inverter 3 is added to or deducted from the output of the speed adjusting circuit 6 at an arithmometer 9, and, based on the obtained value, the rotation speed of the slave side spindle SSP is caused to coincide with the rotation speed of the master side spindle MSP through the inverter 3 and the induction motor $IM_2$.

On the other hand, a position adjuster 7 is applied with output signals of the master side position detector $PE_1$ and the slave side position detector $PE_2$, and the position variation of the respective spindles MSP and SSP is calculated. The output of the position adjuster 7 is added to or deducted from the speed standard value of the slave side inverter 3 at an arithmometer 8. By this, retaining the respective spindles MSP and SSP in a predetermined positional relation, what is called, the synchronous control, is carried out.

In the synchronous operation system as described above, in case the synchronous operation is carried out in an unstable region inherent in the induction motor driven by the inverter, or in a specific speed region of resonance point of a machine system and the like, for example, when irregularities of the rotation in the master side induction motor $IM_1$ occur in the specific speed region, the position adjuster 7 can not follow the irregularities, and the output of the position adjuster 7 keeps approximately constant, so that there has been such a problem that the position variation between the respective spindles MSP and SSP becomes excessively large.

Furthermore, in case the inverter conducts the primary frequency control of the induction motor, when the induction motor is operated in a high speed region (constant output region) exceeding the basic rotation speed (base speed), and the output of the position adjuster is constant with respect to the position variation, the inverter simply conducts the frequency control instead of the speed control, so that as shown in FIG. 4, the induction motor has a characteristic such that the slippage thereof expands from S to S' as the speed increases. In this case, the position variation can not be compensated sufficiently in the above stated synchronous operation system.

Incidentally, in a vector control inverter having a speed control system, a speed command value is compensated in the interior, so that the above stated problem at the high speed region does not occur. That is, the above problem is considered to be specific for inverters for conducting the primary frequency control of the induction motor where the frequency command value is compensated to carry out the synchronous operation.

The present invention has been made to solve the above stated problems, and the object of the present invention is to provide a synchronous operation system wherein the position variation of two rotating elements including a case where the synchronous control is carried out by an inverter controlling the primary frequency of the induction motor, is positively compensated and maintained in a predetermined positional relation, what is called, a synchronous control can be made.

SUMMARY OF THE INVENTION

To attain the above object, according to the present invention, in a synchronous operation system for retaining the rotating positions of two rotating elements driven by respective induction motors in a predetermined positional relation by a position adjuster, what is called, performing a synchronous control, there is provided a gain compensating circuit for adjusting an output of the position adjuster by using a detected speed of one of the rotating elements as a parameter, and the gain compensating circuit adjusts the output of the position adjuster so as to compensate the position variation in a speed region where the position variation becomes excessively large. Further, in a synchronous operation system for retaining the rotating positions of two rotating elements driven by respective induction motors, in which a primary frequency in each induction motor is controlled by an inverter, in a predetermined positional relation by means of a position adjuster, what is called, conducting a synchronous control, there is provided a gain compensating circuit for adjusting an output of the position adjuster by using a detected speed of one of the rotating elements as a parameter, and the gain compensating circuit) adjusts an output of the position adjuster so that an increased slippage in a high speed region (constant output region of the induction motor is compensated, or (this gain compensating circuit) adjusts an output of the position adjuster so that the position variation is compensated at a speed region where the position variation becomes excessively large and, at the same time, adjusts an output of the position adjuster so that an increased slippage in a high speed region (constant output region) of the induction motor is compensated.

In the present invention, the gain compensating circuit adjusts an output of the position adjuster so that a position variation is compensated in a region where the position variation of the two rotating elements becomes excessively large. Thus, a position variation relative to the other rotating element can be prevented from being excessively large.

Further, in case a synchronous control is carried out by using an induction motor and an inverter for performing a primary frequency control of the induction motor, the slip characteristic of the induction motor in the high speed region is compensated by raising the output of the position adjuster by the slippage, so that the position variation is reduced. Furthermore, in this case, in addition to the above, an output of the position adjuster is also adjusted so that the position variation is compensated in a region where the position variation of the two rotating elements becomes excessively large. Thus, the position variation relative to the other rotating element can be prevented from becoming excessively large.

DETAILED DESCRIPTION OF A PREFERRED EMBODIMENT

Figure 1:
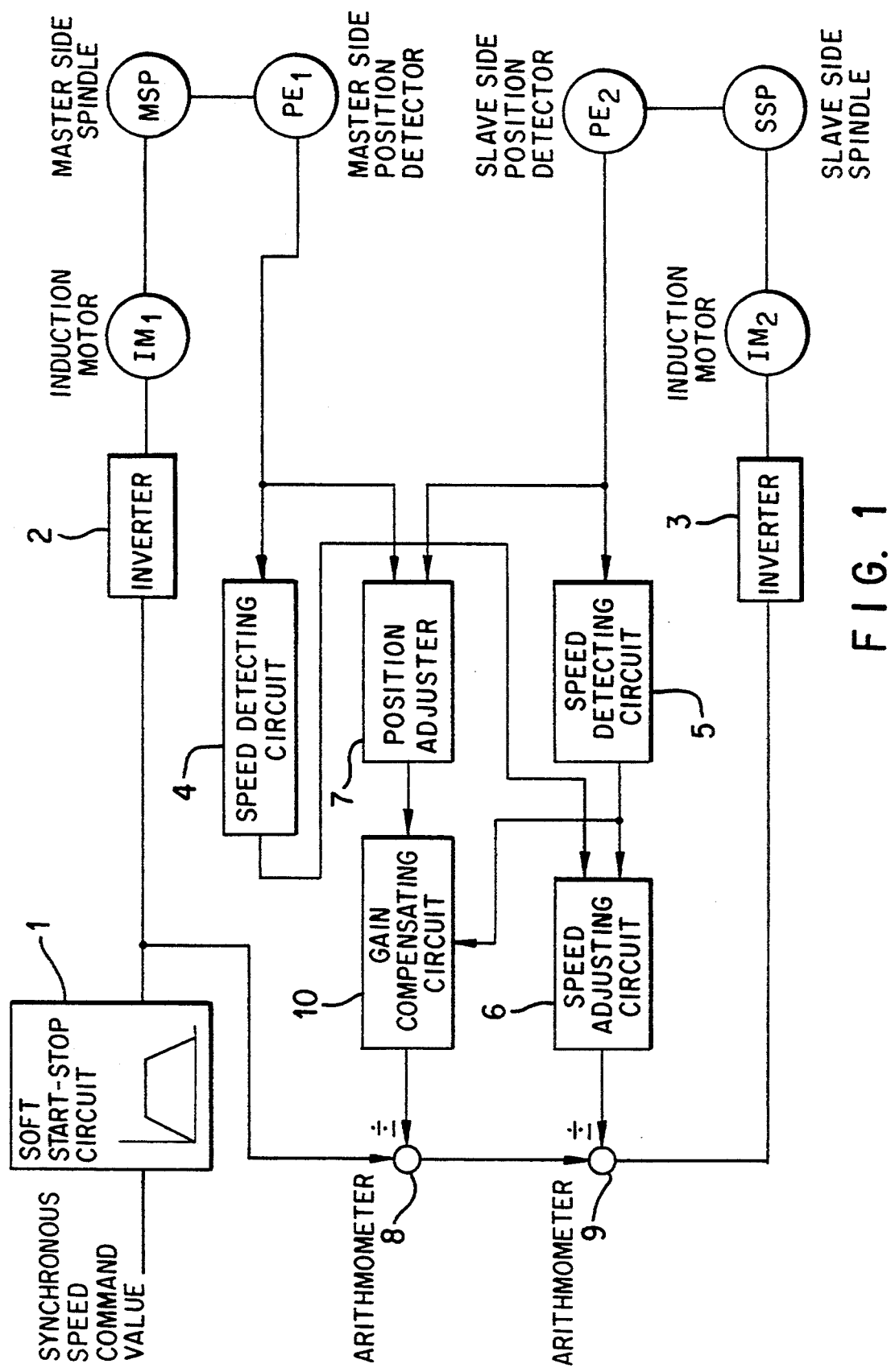
FIG. 1 is a block diagram showing a construction of an embodiment of the present invention.
Figure 3:
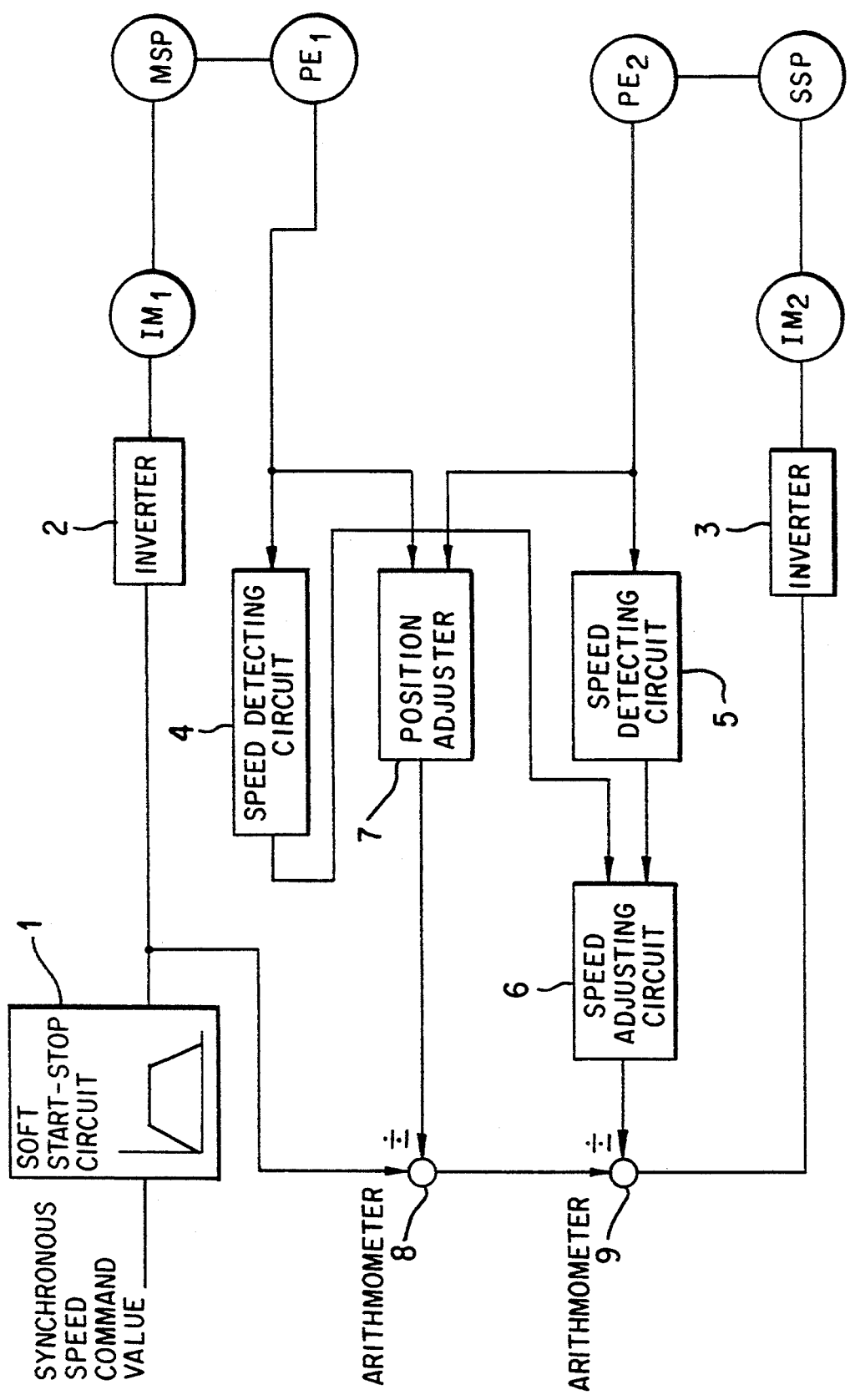
FIG. 3 is a block diagram showing a prior art.
Figure 4:
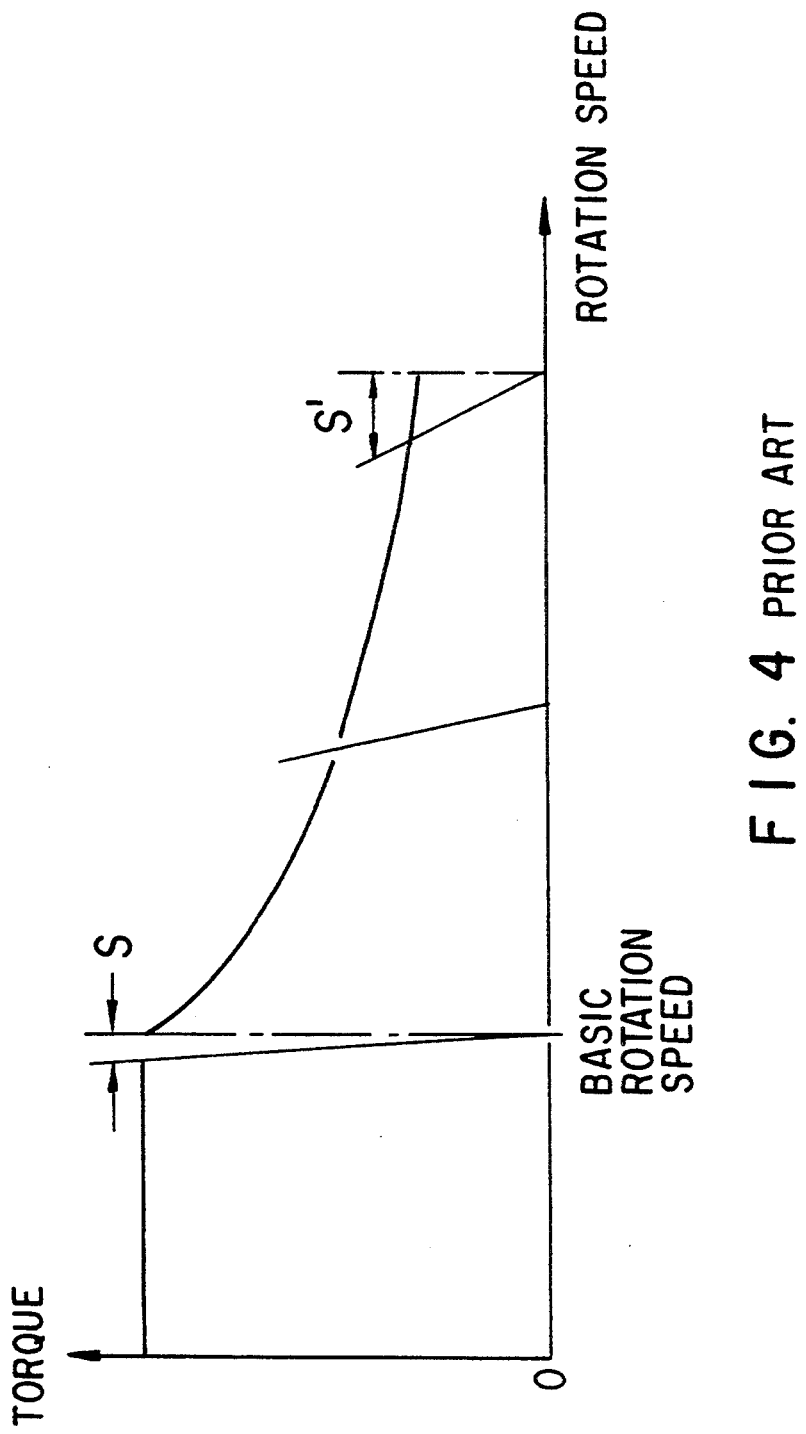
FIG. 4 is a graph showing a characteristic of torque-rotation speed.

Hereinunder, referring to the drawings, an embodiment of the present invention is described. FIG. 1 is a block diagram showing a structure of a synchronous operation system of the present embodiment, wherein the same reference numerals are assigned to the same constituting elements as those in FIG. 3, explanations therefor are omitted, and different portions are mainly explained hereunder.

Namely, in the present embodiment, as shown in FIG. 1, a gain compensating circuit 10 for adjusting an output of a position adjuster 7 is provided, an output of a slave side speed detecting circuit 5, i.e. the detected speed value, is applied to the gain compensating circuit 10, and the output from the position adjuster 7 is adjusted in case the detected speed value is in a region where a position variation of the two rotating elements becomes excessively large.

In case the gain compensating circuit 10 is formed of, for example, a digital circuit using a microcomputer, a table is made by using digital quantities of output values of the slave side speed detection circuit 5 as a parameter, and the table usually contains digital values corresponding to one gain time with respect to the output values of the position adjuster 7 at a speed lower than the basic rotation speed of an induction motor.

Also, in a speed region higher (constant output area) than the basic rotation speed of the induction motor, the table usually contains digital quantities increased in proportion to the rotation speed of the induction motor from the one gain time.

Further, in a specific speed region, the digital quantities are generally changed to a way to decrease the gain relative to the above stored quantities, and are stored.

Since the specific table digital values are determined relative to the characteristics of an induction motor and a machine to be operated, the gain compensating circuit 10 is constructed such that the gain can be programmably changed.

The operation of the gain compensating circuit 10 is explained with reference to FIG. 2.

Figure 2:
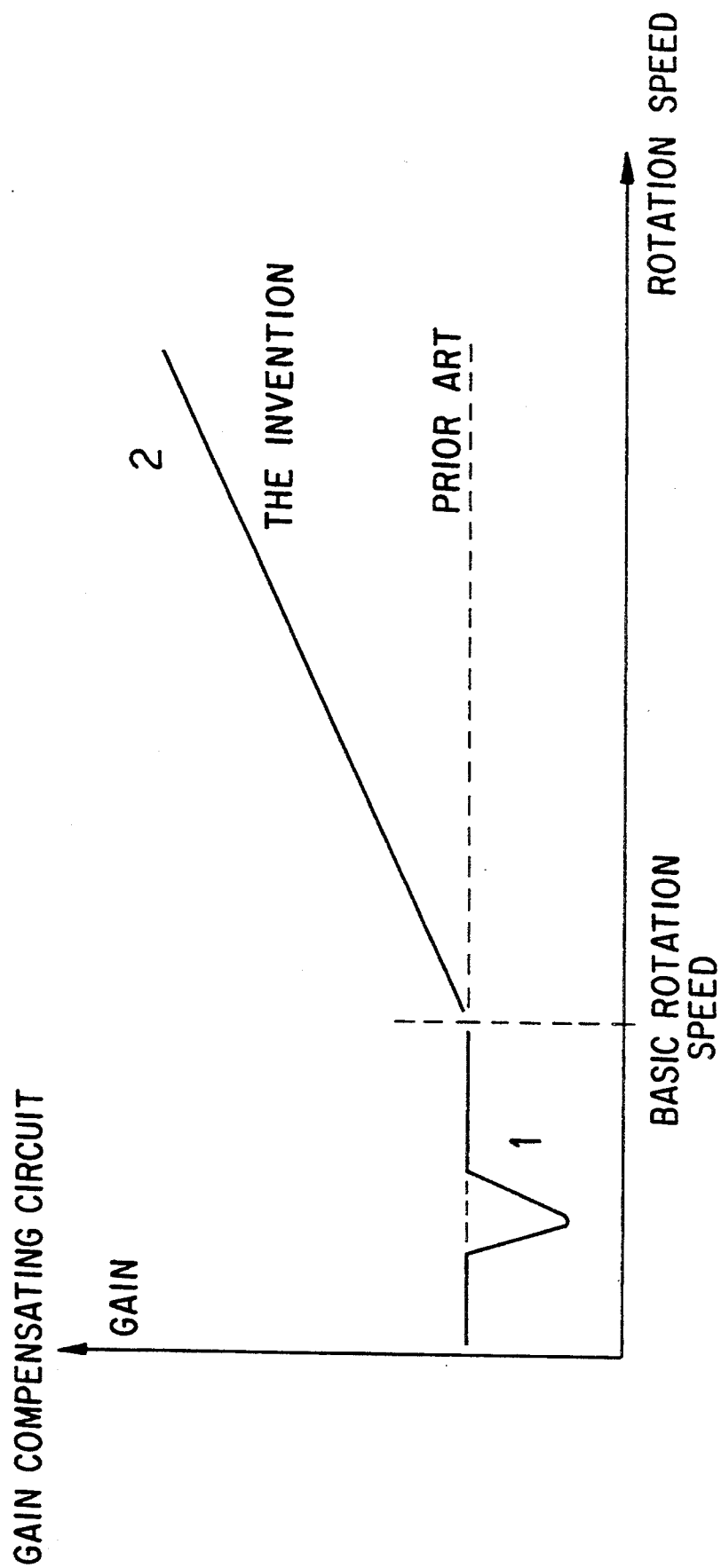
FIG. 2 is a graph for explaining an operation of the embodiment.

FIG. 2 shows a relation between the rotation speeds of respective induction motors $IM_1$, $IM_2$ and the gain compensating values of a gain compensator. In a speed region until the rotation speeds of the respective induction motors $IM_1$, $IM_2$ reach the basic rotation speed, for example, if irregularities of the rotation occur in the master side induction motor and the spindle MSP, the position variation between the respective spindles MSP and SSP due to the irregular rotation becomes excessively large in case the position adjuster is only provided.

Therefore, in the present embodiment, in case the speed value detected by the slave side speed detecting circuit 5 is in the above speed region, the output of the position adjuster 7 is adjusted by the gain compensator 10, and for example, as shown by (1) in FIG. 2, the output is decreased throughout the above speed region.

As described above, the position variation which is a gain-compensated output of the position adjuster 7 is added to or subtracted from a speed standard value of the slave side inverter 3 at an arithmometer 8, so that it is possible to prevent generation of an excessive position variation incurred on the slave side induction motor $IM_2$ and the spindle SSP due to the irregular rotation on the master side induction motor $IM_1$ and spindle MSP.

Further, in case the synchronous control is carried out by using the induction motor and the invertor which performs a primary frequency control of the induction motor as in the present embodiment, in regard to a slip characteristic of the induction motor in the high speed region (constant output region) higher than the basic rotation speed, as shown by (2) in FIG. 2, the gain compensating circuit 10 is operated such that the output of the position adjuster 7 is raised by a value corresponding to a slippage in a high speed region higher than the basic rotation speed, so that sufficient compensation can be obtained in the high speed region and the position variation is positively prevented.

Also, by provision of the gain compensating circuit 10, the adjusting time until the synchronization is completed can be shortened.

According to the present invention as described hereinabove, a rotation speed of one rotating element is detected, and in case the detected value is in a specific speed region, an output of the position adjuster is adjusted, so that the position variation which is added to or reduced from the speed basic value of the rotating element is varied, to thereby prevent a position variation relative to the other rotating element from becoming excessively large.

Particularly, in case the synchronous control is carried out by using an induction motor and an invertor which performs a primary frequency control of the induction motor, a slippage of the induction motor in a high speed region exceeding the basic rotation speed can be compensated to positively remove the position variation as well as the adjusting time until the synchronization is completed, can be shortened.

What is claimed is:

1. A synchronous operation system for maintaining first and second rotating elements in a predetermined positional relation, comprising,
   - a first induction motor connected to the first rotating element for rotating the same,
   - a second induction motor connected to the second rotating element for rotating the same,
   - a position adjuster connected to the first and second rotating elements and outputting a signal for a difference of the second rotating element with respect to the first rotating element,
   - speed detecting means connected to at least one of the first and second rotating elements for detecting a speed of said at least one of the first and second rotating elements, and
   - a gain compensating circuit connected to the position adjuster and the speed detecting means, said gain compensating circuit adjusting the signal outputted from the position adjuster based on the speed detected by the speed detecting means, said adjusted signal being supplied to the second induction motor so that rotational speed of the second induction motor is maintained in the predetermined positional relation relative to the first rotating element.

2. A synchronous operation system according to claim 1, wherein said speed detecting means includes a first speed detecting circuit connected to the first rotating element for detecting a speed of the first rotating element, and a second speed detecting circuit connected to the second rotating element for detecting a speed of the second rotating element, said second speed detecting circuit being connected to the gain compensating circuit for providing a signal of the speed from the second rotating element.

3. A synchronous operation system according to claim 2, further comprising a speed adjusting circuit connected to the first and second speed detecting circuits, said speed adjusting circuit calculating a difference of the speed of the second rotating element relative to the speed of the first rotating element and outputting a signal to adjust the speed of the second rotating element.

4. A synchronous operation system according to claim 3, further comprising a power source connected to said both first and second induction motors for supplying a same power to the first and second induction motors.

5. A synchronous operating system according to claim 1, further comprising inverters connected to the first and second induction motors for controlling rotations of the first and second induction motors.

6. A synchronous operation system according to claim 5, wherein said gain compensating circuit includes data for a speed region where the position variation becomes excessively large and for a speed region where slippage of the second induction motor is increased, and adjusts the signal outputted from the position adjuster based on the data relative to the speed detected by the speed detecting means.

* * * * *